July 25, 1950
E. J. ALBRIGHT
2,516,499
CONVEYER FOR EVISCERATING APPARATUS
Filed Feb. 9, 1945
2 Sheets-Sheet 1
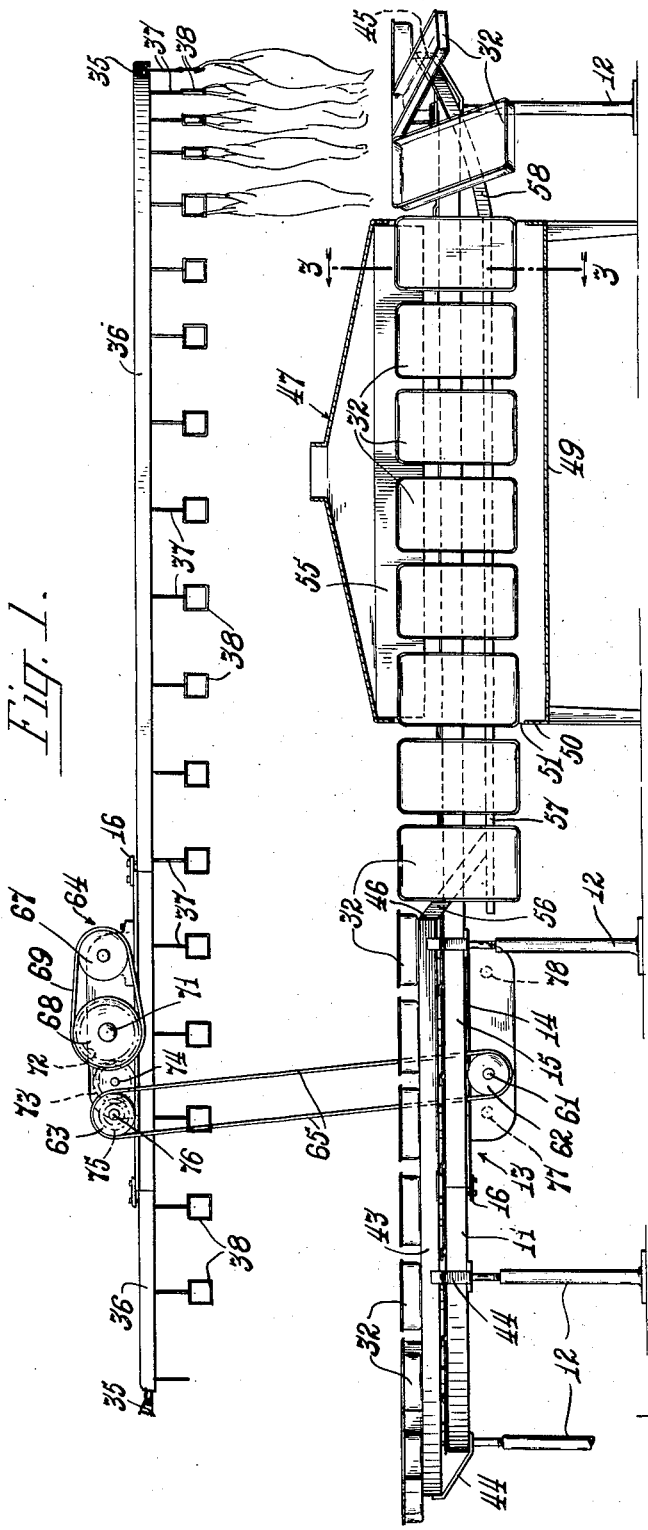
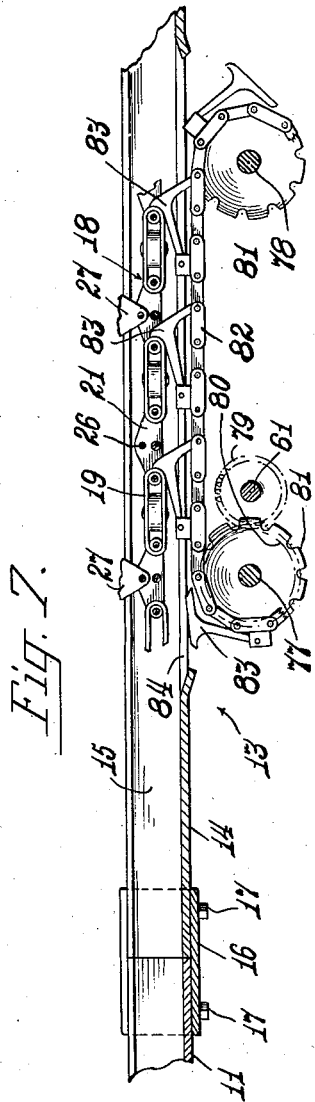
INVENTOR.
EDWARD J. ALBRIGHT
BY
ATTORNEY July 25, 1950 E. J. ALBRIGHT 2,516,499
CONVEYER FOR EVISCERATING APPARATUS
Filed Feb. 9, 1945 2 Sheets-Sheet 2
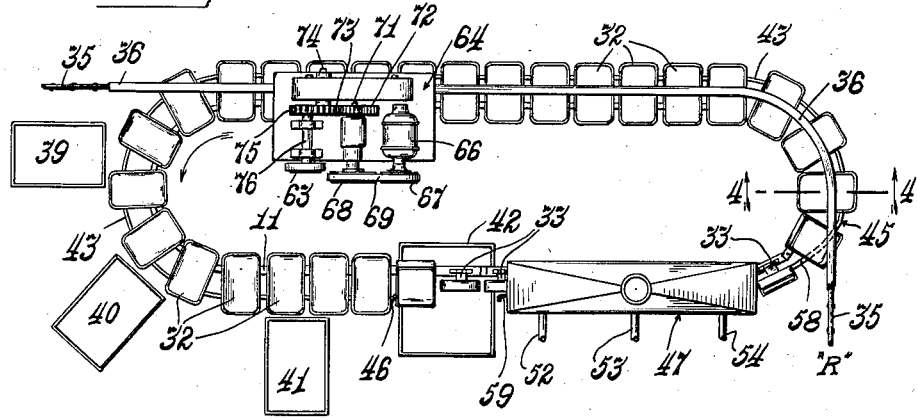
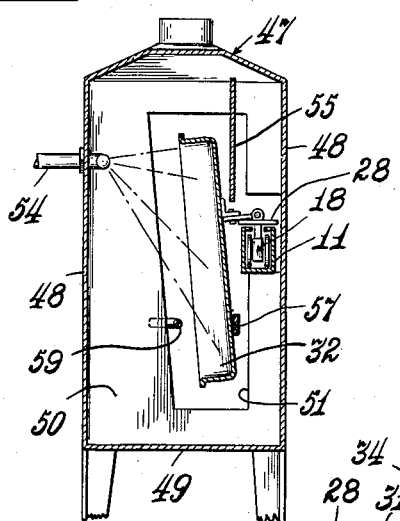
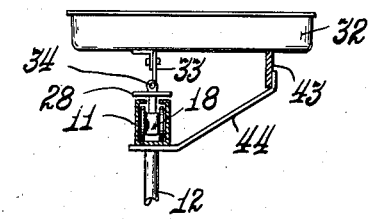
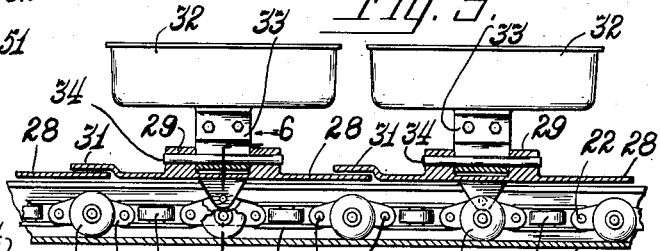
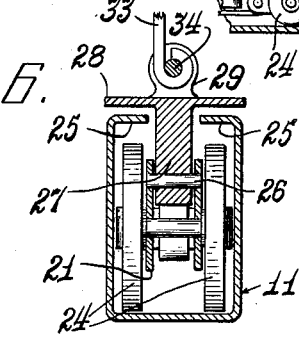
INVENTOR.
EDWARD J. ALBRIGHT
BY
ATTORNEY Patented July 25, 1950

2,516,499

UNITED STATES PATENT OFFICE 2,516,499

CONVEYER FOR EVISCERATING APPARATUS

Edward J. Albright, Chicago, Ill.

Application February 9, 1945, Serial No. 577,039

6 Claims. (Cl. 198—229)

The invention relates to improvements in conveyer systems and more particularly to such a system embodying novel structural features especially adapting it for use in evisceration and cleaning of poultry or the like.

Apparatus of the general character of the system of the present invention are not entirely satisfactory in use because the viscera receptacles and the poultry conveyer are not advanced in synchronism and as a result considerable difficulty is experienced in an effort to deposit all of the viscera in the pans or such other receptacles as are provided for this purpose. As a result a very untidy and unsatisfactory condition prevails in the region of the apparatus and much of the viscera becomes lost. It is, therefore, an object of the invention to provide an apparatus of the character described with common drive means for advancing the overhead poultry conveyer in unison with the viscera pans arranged therebeneath, whereby said pans are each located in vertical alignment with a fowl suspended thereabove.

Known types of apparatus useful in conjunction with the evisceration of poultry, having traveling viscera pans, or other receptacles, are unsatisfactory also because of the difficulty occasioned in emptying the viscera pans and the inability to wash and sterilize the pans efficiently without also washing out the lubricant necessary to the pan conveyer mechanism. Thus it is another object of the invention to provide novel means to wash and sterilize the viscera pans without subjecting the conveyer chain to the washing and sterilizing medium.

Another object is to provide an apparatus, including an endless conveyer having pans hingedly mounted thereon, wherein the pans are supported in a useable position over a greater part of the distance of travel of said conveyer.

Another object is to provide a conveyer chain with novel hinge elements adapted to hingedly support pans in spaced relation thereon.

Another object is to provide an apparatus of the character described including an endless chain having a series of pans hingedly connected thereto, with novel means adapted to position and hold said pans in a substantially horizontal plane while the chain is traversing a predetermined portion of its path and to enable said pans to rest in a substantially vertical position while a remaining portion of the path is traversed by said chain.

Another object is to provide an apparatus of the kind disclosed herein with novel means to restrict movement of the pans out of their vertically suspended position while being washed and sterilized.

Other and further objects of the present invention will be apparent from the following description and claims and are illustrated in the accompanying drawings, which by way of illustration show a preferred embodiment and the principle thereof and which is considered to be the best mode contemplated for applying that principle. Other embodiments of the invention embodying the same or equivalent principle may be used and structural changes may be made as desired by those skilled in the art without departing from the present invention and the purview of the appended claims.

In the drawings,

Fig. 1 is a side elevational view of the improved apparatus showing the washing and sterilizing unit in section.

Fig. 2 is a plan view of the apparatus.

Fig. 3 is a vertical sectional detail view taken on line 3—3 of Fig. 1.

Fig. 4 is a transverse sectional detail view taken on line 4—4 of Fig. 2.

Fig. 5 is a fragmentary longitudinal sectional detail view of the conveyer chain, illustrating the pivotal mounting for the pans.

Fig. 6 is a transverse sectional view taken on line 6—6 of Fig. 5.

Fig. 7 is a sectional detail view similar to Fig. 5, but illustrating details of the driving mechanism for the pan conveyer chain.

Referring particularly to the accompanying drawings, the apparatus includes a table-like construction consisting of an oval-shaped track 11 supported in a horizontal position elevated above the floor upon suitable legs 12. The legs 12 may be constructed for vertical adjustment so as to accommodate the apparatus to uneven supporting surfaces. The track 11 preferably is formed of sheet material, substantially U-shaped in section, as best illustrated in Fig. 6, and a portion of said track along one of its longitudinal sides is cut away to provide for the mounting in close association therewith of a driving unit, generally indicated at 13. The unit 13 includes a substantially rectangular bed-plate 14 having a channel-like formation 15 on its upper face arranged to register with the abutted ends of the track 11 to provide a continuous unbroken track throughout the entire configuration of the table. The abutted ends of the track portion 11 may be secured to the bed-plate 14 as by a suitable clamp 16 and related bolts 17 to provide a unitary rigid construction. The driving unit 13 includes suitable mechanism to be described in detail presently operative to impart positive and uniform movement of an endless conveyer chain 18 arranged within the track 11.

As best illustrated in Figs. 5, 6 and 7, the conveyer chain 18, which may be of any suitable construction, preferably consists of a plurality of links 19 and 21 alternately connected end to end as by pins 22. The links 19 carry rollers 23 rotatable upon a vertical axis for minimizing friction on the side walls of the track 11 when the conveyer chain is moving around a curve as at either end of the table. The alternate links 21 have a pair of rollers 24 journalled therein on a horizontally disposed axis, which rollers normally roll along the bottom wall of the track 11 and are adapted to engage the inwardly turned top margins 25 of said track when the conveyer chain moves upwardly as on an incline. Each link 21 also includes a cross pin 26 which serves as a pivotal mounting for a lug 27 formed on the bottom face of a rectangular plate 28 carrying hinge elements 29.

As is best illustrated in Fig. 5, one plate 28 is mounted on every second alternate link 21 and each of said plates is suitably offset upwardly at one end to provide a marginal lip 31 which overlies the opposite end of the next adjacent plate. It will thus be observed that the plates 28 provide an unbroken covering for the open top side of the track 11 so as to effectively prevent waste, or the like, from entering the track 11 and impairing the operation of the conveyer chain therein.

The spaced apart hinge elements 29 provided on the top face of each plate 28 constitute means for pivotally connecting a plurality of viscera pans 32 to the conveyer chain for movement therewith. As shown, each pan 32 has a rigid depending complemental hinge element 33 which extends between the hinge elements 29 on a related plate 28 and is pivotally retained as by a king pin 34. The depending complemental hinge element 33 on each pan is of sufficient height so that when said pans are in a substantially vertical position, as illustrated in Figs. 1 and 3, they will hang freely outwardly of one face of the track 11 and when in the horizontal position illustrated in Fig. 4 they are supported at an elevation above said track.

The table, consisting of the horizontally disposed track 11 and endless conveyer chain 18 carrying the pans 32 as described hereinabove, is used in the present apparatus in conjunction with an overhead conveyer of any suitable type and of a kind adapted to advance poultry into positions to be worked upon by workers located at various stations around the track 11.

As best shown in Fig. 2, an overhead conveyer chain 35, which is like chain 18, is suitably enclosed within and guided along an overhead, inverted, U-shaped track 36 which may be suspended from any suitable support (not shown) and is arranged to advance poultry from its receiving end "R" along a path in substantial vertical alignment with at least a predetermined portion of the track 11. In the instant arrangement, the track 36 is located above and in vertical alignment with one end and one longitudinal side of the table 11 and it will be noted upon referring to Fig. 1, that the chain 35 carries a plurality of pendants 37, including shackles 38, spaced apart distances corresponding to the spacing of the viscera pans 32 on the table conveyer chain 18. Thus it will be observed that during the travel of the two conveyers along like paths, a fowl is held suspended above each of the related pans 32.

It is during the travel of the fowl and pans through this area that the evisceration is performed. The viscera, as well as any wastes, are deposited in the pans 32 and upon the completion of the eviscerating operation the eviscerated fowl are carried away from the table 11 by continuous operation of the conveyer chain 35 for further treatment or packing. The pans 32, containing viscera, continue to advance around the track 11 and, at various stations along a remaining portion of said track, certain recoverable parts of the viscera, such as the heart, liver and gizzard, are removed from the pans and deposited in sinks 39, 40 and 41, respectively, or such other receptacles as may be provided. Any viscera remaining in the pans after they have advanced past the sink or other container 41 is waste and must be disposed of. Accordingly the present apparatus is provided with means to accomplish automatic dumping of such waste into a truck or other receptacle 42.

This movement of the pans from the horizontal position required for receiving the viscera, into a vertical or dumping position about their pivot 34, is accomplished by means associated with a rail 43 which is provided outwardly of the track 11. The rail 43 has its upper edge supported in a plane corresponding to the plane of the bottom of the pan while horizontal and it preferably is secured in this position by means of brackets 44 which extend outwardly and upwardly from the track 11, one preferably at each leg mounting. The rail 43 has one end terminating substantially at the junction of the overhead conveyer with the table, as at 45 (Fig. 1) and its other end terminates, as at 46, adjacent to the waste receptacle 42. The portion of the longitudinal side of the table not provided with the rail 43 is fitted with means to wash and sterilize the pans after the contents thereof have been dumped into the waste receptacle 42 and while the pans are still in a substantially vertical position. Such washing and sterilizing means preferably is embodied in a unit 47 which consists of a sheet metal housing having side walls 48, bottom 49 and end walls 50. The unit 47 is arranged with relation to the table so that the track 11 extends therethrough as best shown in Fig. 3, and the end walls 50 of said unit are suitably cut out as at 51 to enable free passage of the pans 32 therethrough. The unit 47 preferably is provided with a plurality of spraying elements, such as at 52, 53 and 54, or other suitable means, the first of which is adapted to discharge a spray of cold water onto the inside face of the vertically suspended pan during its initial advance through the unit. As each pan continues its advance through the unit, it is carried into the path of a steam spray ejected by the second spraying element 53 and before leaving the unit it is again washed by a cold spray at 54.

Obviously excessive wetting of the conveyer chain 18 as it passes through the washing and sterilizing unit 47, would tend to remove all of the lubricant necessary to efficient operation. Consequently means is provided within the washing and sterilizing unit to prevent water or steam from the sprays from entering the track 11. As shown best in Figs. 1 and 3, a baffle plate 55 is provided in the upper end of the unit 47. This plate is substantially coextensive with the length of the unit 47 and its lowermost edge is disposed above the track 11 a distance only sufficient to enable the hinge elements 33 on each pan to pass freely therebeneath. This baffle plate, as well as the cover plates 28 carried by the endless chain conveyer 18, serve to effectively block off and seal the track 11 against the entrance of any excessive moisture.

As has been explained hereinabove, the pans 32 are normally held substantially horizontal by the rails 43 for a predetermined distance of their advance around the table and are permitted to drop into a vertical position to dump out their contents and to remain in such position while being washed and sterilized, whereupon they are again raised into their initial horizontal position. Accordingly, the apparatus is provided with means to cause a gradual lowering of the pans from the horizontal position into the vertical position and with means to again elevate said pans into their horizontal position. The means to gradually lower the pans, preferably consists of a rail section 56, shown in Fig. 1, provided at the end 46 of the rail 43. This rail section merges with the rail 43 and is inclined downwardly and inwardly toward the track 11 to merge with a horizontally disposed auxiliary rail 57 located below and in a plane substantially coincident with the outside face of the track 11. Thus it will be seen that as a pan advances off the end of the rail 43 it gradually swings downwardly into its vertical or dumping position. The auxiliary rail 57 extends through the sterilizing and washing unit 47 and provides a backing surface against which the vertically suspended pans 32 rest during their movement through the unit. The end of the auxiliary rail 57, at the outlet end of the unit 47, merges with an arcuate rail portion 58 which curves around the related end of the table and gradually rises so as to merge with the end 45 of the rail 43. This arcuate rail portion 58 provides means for gradually elevating the pans 32 from their vertical position into the horizontal position required for use. Inasmuch as the pans 32 are subjected to the violent action of the sprays while passing through the washing and sterilizing unit, a guide rod 59 provided in said unit, extends the entire length thereof and lies in front of the vertically suspended pans so as to prevent said pans from swinging into such angular positions as might prevent their free passage through the opening 51 in the unit end wall 50.

It has been mentioned hereinbefore that one of the features of the present invention is to provide means for advancing the poultry in unison with the advance of the viscera pans 32. Accordingly, common drive means is provided for both endless conveyer chains 18 and 35. As best shown in Fig. 1, the pan conveyer driving unit 13 includes a shaft 61 having a pulley 62 on its extended end operatively connected with a pulley 63, on a power driven unit 64 associated with the overhead conveyer chain 35, by means of a belt 65. The power driven unit 64 is substantially like the unit 13, except that it includes a motor 66, carrying a pulley 67 for imparting rotation to an idler pulley 68 through a belt 69. The pulley 68 is carried on an end of an idler shaft 71 having a gear 72 fixed on its other end, constituting one of a plurality of gears in a gear reduction drive, best shown in Fig. 2. The gear 72 meshes with a gear 73, carried on an intermediate shaft 74 in the upper power unit 64, which meshes with a pinion 75 firmly secured on the shaft 76 carrying the pulley 63. Thus it will be observed that operation of the motor 66 will impart rotation to the intermediate shaft 74 in the upper unit 64 and to the shaft 61 in the lower unit 13. Since the units 13 and 64 are alike in the construction of the mechanism operated by rotation of their respective shafts 61 and 74, the following description, which is limited to the remaining details of construction of but one of said units, is applicable to both and like numerals applied to both units will identify corresponding parts.

As best shown in Figs. 1 and 7, the unit 13, having the shaft 61 driven by the pulley 62, also includes parallel shafts 77 and 78. The shaft 77 is positively driven upon rotation of the shaft 61, as through gears 79—80, and both shafts 77 and 78 carry sprockets 81 having an endless chain 82 trained thereover. The chain 82 carries a plurality of uniformly spaced apart lugs 83 which extend through a slot 84 in the bed-plate 14 and are adapted to engage and disengage successively with the links 19 of the conveyer chain 18 to thereby advance said conveyer chain 18 at a uniform rate of speed during the operation of the unit 13. The like construction provided in the upper unit 64 similarly co-acts with the endless conveyer 35 to advance said conveyer at the same uniform rate of speed as the conveyer chain 18. Thus it will be evident that both conveyers are advanced in unison so as to retain poultry suspended from the overhead conveyer above a related pan on the table throughout their coinciding paths of travel.

Although a preferred form of construction has been disclosed in the accompanying drawings and described in detail hereinabove, it should be understood that the invention is capable of embodying a variety of modifications in detail structure and may be incorporated in apparatus designed other than as illustrated without departing from the spirit of the invention and the scope of the appended claims.

I claim:

1. An apparatus of the character described comprising, in combination, an endless track disposed in a horizontal plane, a washing and sterilizing unit through which said track extends, an endless conveyer operable in said track, a plurality of pans, hinge elements connecting the pans to said conveyer, said hinge elements being adjacent complemental ends of said pans, and a guide-rail associated with the track and upon which the other ends of said pans rest so as to be retained in a horizontal plane, said guide-rail terminating short of each end of the sterilizing unit to enable the pans to assume a substantially vertical position while advancing through said unit.

2. An apparatus of the character described comprising, in combination, an endless track disposed in a horizontal plane, a washing and sterilizing unit through which said track extends, an endless conveyer chain operable in said track, cover plates on said chain overlying said track, a plurality of pans, hinge elements connecting the pans to said conveyer chain, said hinge elements being adjacent complemental ends of said pans, and a guide-rail associated with the track and upon which the other ends of said pans rest so as to be retained in a horizontal plane, said guide-rail terminating short of each end of the sterilizing unit to enable the pans to assume a substantially vertical position prior to and while advancing through said unit.

3. The combination of an endless conveyer having pans thereon and a washing and sterilizing unit through which said conveyer and pans are advanced, said unit comprising a housing open at both ends, a plurality of spray elements in said unit adjacent one side adapted to discharge sprays against pans advancing from end to end of the unit, and a baffle coextensive with the length of said unit located above said conveyer to prevent said sprays from coming into contact with the conveyer.

4. An apparatus of the character described, comprising, in combination, an endless conveyor operable in a horizontal plane, a plurality of pans hingedly connected to and carried by said conveyor, means to retain said pans in a horizontal plane while said conveyor is advanced a predetermined distance along its path of travel, means for tilting said pans to dispose the same substantially in a vertical plane, and a washing unit comprising a housing through which said pans are arranged to pass while disposed in said vertical plane, said housing having a baffle plate disposed forwardly of said conveyor and adapted to prevent washing media from coming in contact with the conveyor.

5. An apparatus of the character described comprising, in combination, an endless conveyor chain, a horizontal track along which said chain operates, a series of elemental cover plates on said chain providing a continuous covering over said track, a plurality of pans hingedly connected to and carried by said chain, means to retain said pans in a horizontal plane while said chain is advanced a predetermined distance along its path of travel, means for tilting said pans to dispose the same substantially in a vertical plane, and a washing and sterilizing unit comprising a housing through which said pans are arranged to pass while disposed in said vertical plane.

6. The combination of an endless conveyor having pans thereon and a washing and sterilizing unit through which said conveyor and pans are advanced, said unit comprising a housing open at both ends, a plurality of spray elements in said unit adjacent one side adapted to discharge sprays against pans advancing from end to end of the unit, and a baffle plate in said unit located above and in front of the conveyor and in front of which said pans pass to prevent said sprays from coming into contact with the conveyor.

EDWARD J. ALBRIGHT.

REFERENCES CITED

The following references are of record in the file of this patent:

UNITED STATES PATENTS

| Number | Name | Date |
|---|---|---|
| 708,759 | Dodge | Sept. 9, 1902 |
| 1,537,846 | McKenzie | May 12, 1925 |
| 1,831,388 | Hippenmeyer | Nov. 10, 1931 |
| 2,210,377 | Onorato et al. | Aug. 6, 1940 |
| 2,381,044 | Franz | Aug. 7, 1945 |